(12) United States Patent
Bosis et al.

(10) Patent No.: US 9,045,122 B2
(45) Date of Patent: Jun. 2, 2015

(54) WEAR SENSOR

(75) Inventors: Alberto Bosis, Curno (IT); Filippo Cornara, Curno (IT)

(73) Assignee: FRENI BREMBO, S.P.A., Curno (IT)

(*) Notice: Subject to any disclaimer, the term of this patent is extended or adjusted under 35 U.S.C. 154(b) by 0 days.

(21) Appl. No.: 14/241,127

(22) PCT Filed: Aug. 17, 2012

(86) PCT No.: PCT/IB2012/054187
§ 371 (c)(1),
(2), (4) Date: Apr. 30, 2014

(87) PCT Pub. No.: WO2013/030711
PCT Pub. Date: Mar. 7, 2013

(65) Prior Publication Data
US 2014/0245824 A1    Sep. 4, 2014

(30) Foreign Application Priority Data
Aug. 26, 2011    (IT) .............................. MI2011A1552

(51) Int. Cl.
*F16D 66/02*    (2006.01)
*B60T 17/18*    (2006.01)

(52) U.S. Cl.
CPC ................. *B60T 17/18* (2013.01); *F16D 66/02* (2013.01); *F16D 66/024* (2013.01)

(58) Field of Classification Search
CPC ....... F16D 66/02; F16D 66/024; B60T 17/22; B60T 17/088
USPC .......................................................... 73/129
See application file for complete search history.

(56) References Cited

U.S. PATENT DOCUMENTS 4,391,350 A * 7/1983 Moriya .................... 188/1.11 L
5,133,431 A * 7/1992 Braun ...................... 188/1.11 L
(Continued)

FOREIGN PATENT DOCUMENTS

DE        19609452      9/1996
DE      102006016851   10/2007
(Continued)

OTHER PUBLICATIONS

International Search Report—mailing date of Jan. 17, 2013.

*Primary Examiner* — Freddie Kirkland, III
(74) *Attorney, Agent, or Firm* — Thomas Horstemeyer, LLP

(57) ABSTRACT

An assembly (1) for detecting the wear of a brake pad of a disk brake, wherein said assembly comprises at least one sensor body (2) and at least one spring (4), said assembly being suitable for cooperating with said pad (10) which comprises a support plate (11), suitable for being supported by the disk brake, and to which there is associated friction material (12), suitable for to coming into contact with braking surfaces of a disk-brake disk, and wherein said at least one sensor body (2) is coupled geometrically to said support plate (11), said at least one spring (4) surrounding said at least one sensor body (2) so that said at least one spring (4) is positioned in said geometric coupling between said at least one sensor body (2) and said plate (11) and presenting projections (41) for the snap-coupling to said support plate (11), and wherein said at least one spring (4) has indentations (42) bent towards the at least one sensor body (2) for constraining said at least one spring (4) to said at least one sensor body (2), wherein said indentations (42) comprise end or terminal sections (43) of the spring with at least one of their edges (44) facing towards the at least one body (2).

10 Claims, 12 Drawing Sheets

(56) References Cited

U.S. PATENT DOCUMENTS

| | | | |
|---|---|---|---|
| 5,151,681 A * | 9/1992 | Valmir et al. | 340/454 |
| 5,454,450 A * | 10/1995 | Tanigawa | 188/1.11 L |
| 5,678,662 A * | 10/1997 | Giorgetti et al. | 188/1.11 W |
| 5,833,033 A * | 11/1998 | Takanashi | 188/1.11 L |
| 5,839,545 A * | 11/1998 | Preston et al. | 188/1.11 L |
| 6,095,290 A * | 8/2000 | Takanashi | 188/1.11 L |
| 6,290,027 B1 * | 9/2001 | Matsuzaki | 188/1.11 L |
| 6,357,290 B1 * | 3/2002 | Asao et al. | 73/129 |
| 6,478,119 B2 * | 11/2002 | Fujiwara et al. | 188/1.11 W |
| 8,069,960 B2 * | 12/2011 | Wille et al. | 188/1.11 W |
| 2010/0000826 A1 * | 1/2010 | Wille et al. | 188/1.11 W |

FOREIGN PATENT DOCUMENTS

| | | |
|---|---|---|
| DE | 202008013226 | 2/2009 |
| EP | 2012037 | 1/2009 |
| EP | 2182236 | 5/2010 |

* cited by examiner

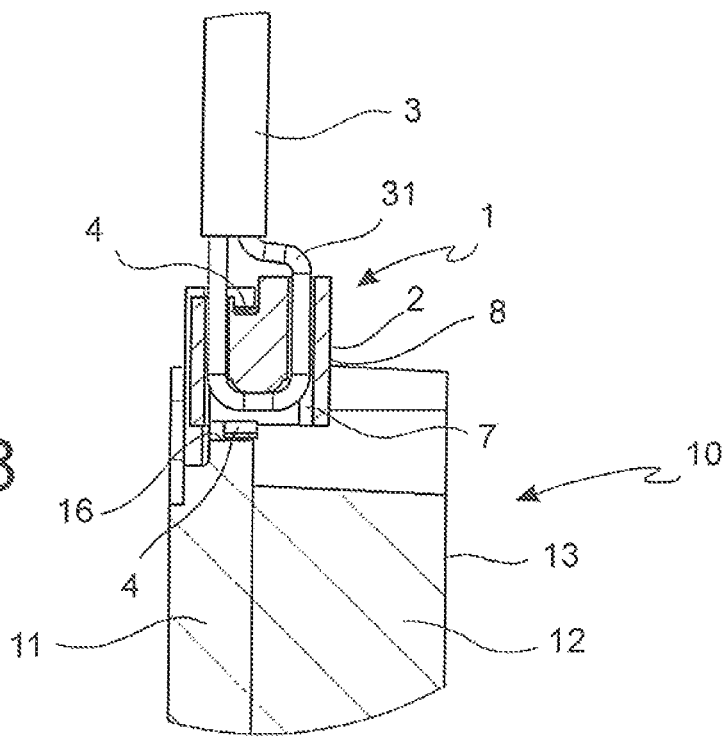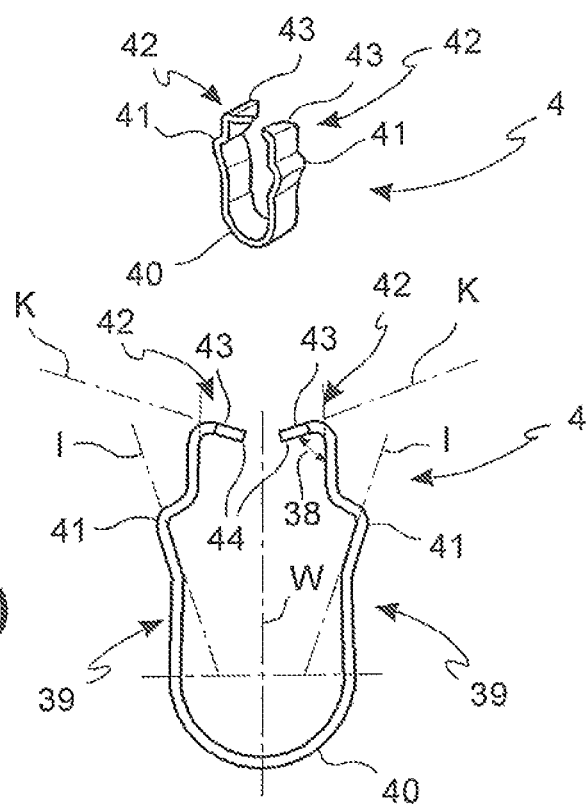

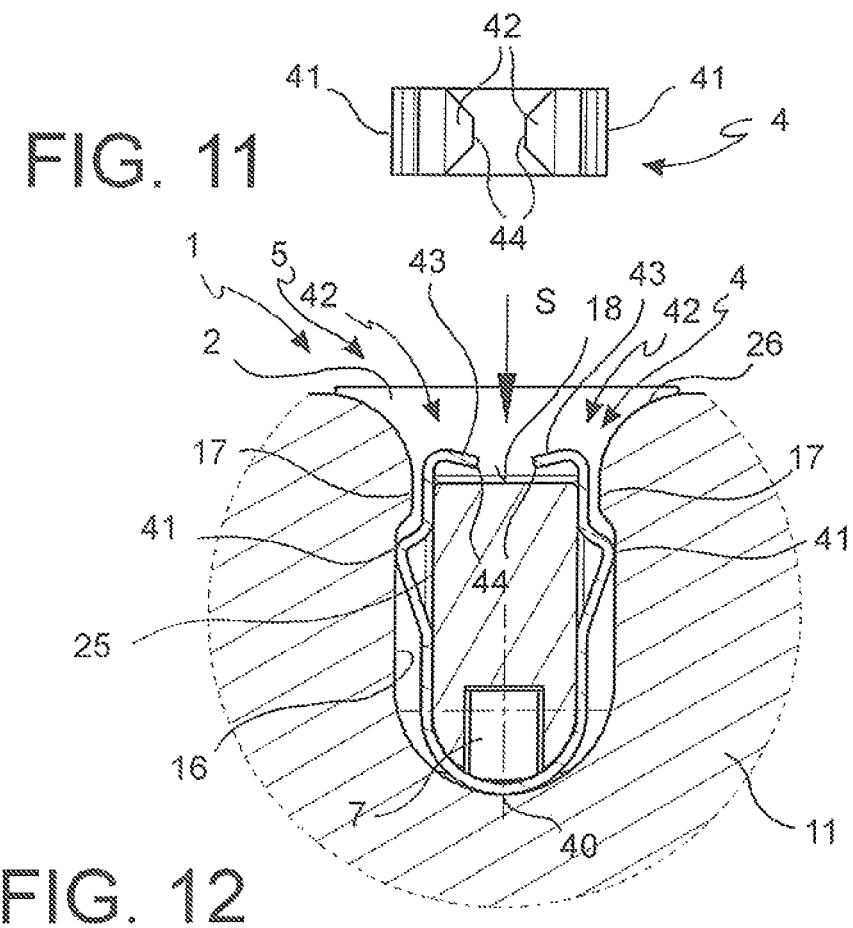
FIG. 11
FIG. 12
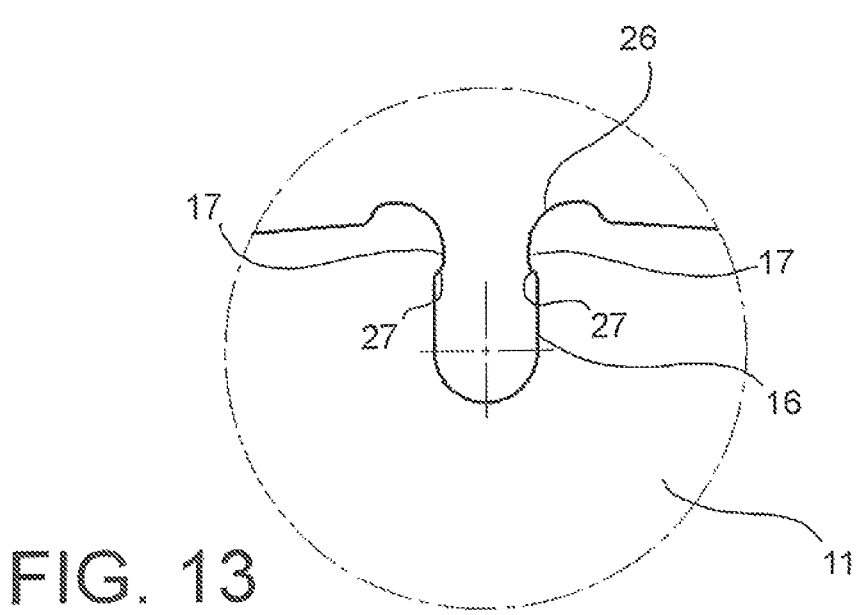
FIG. 13

WEAR SENSOR

CROSS-REFERENCE TO RELATED APPLICATION

This application is the 35 U.S.C. §371 national stage of PCT Application No. PCT/IB2012/054187, entitled "Wear Sensor" and filed Aug. 17, 2012, which is herein incorporated by reference in its entirety and which also claims priority to, and the benefit of, Italian application no. MI2011A001552, filed Aug. 26, 2011, which is herein incorporated by reference in its entirety.

The present invention relates to an assembly for detecting the wear of a brake pad of a disk brake, to a kit comprising a brake pad and the aforesaid assembly and to a brake caliper comprising the aforesaid kit.

As is known, a disk brake exerts a braking action, for example of a vehicle, by drawing together brake pads and opposite friction surfaces of a disk for a disk brake rotating together with the wheel shaft or axis of the vehicle.

As is further known, the brake pad comprises a support plate on which the friction material is supported, which is worn by friction against the braking surfaces of the disk during the braking action.

To prevent excessive wear of the friction material from bringing the support plates into contact with the braking surfaces of the disk, drastically modifying the braking characteristics of the braking system and irremediably deteriorating the braking surfaces of the disk, it is known of to use detectors of the wear of the friction material which substantially detect a limit condition of wear of the friction material to warn the driver or service mechanics of the need to replace the pads.

As is known for example from the document MI1995A000482 in the name of the same applicant, a disk brake may comprise a caliper body which supports a pad by means of a plate in a position facing the disk. Said disc brake comprises a device for visually detecting the wear of the pad having a rod associated to the plate by attachment means which by moving during the wear of the pad in relation to a visible reference associated with the caliper body indicates the state of wear of the pad. Said rod is connected to the pad by means of a head detachably inserted by a snap coupling in a seat thereof. The snap coupling takes place with the presence of a spring housed between the head and the seat and having the free ends bent away from the head and coming out of the seat so as to be gripped by an operator, disengaging the snap coupling between the head and the seat of the pad.

This known solution has various drawbacks. Frequently, during vehicle maintenance procedures, at the moment of replacing the pads of the brake disk, it may be necessary to extract the wear signalling device of the by now worn pad. The dirt accumulating during use of the vehicle between the pad seat and the device and the deterioration of the materials frequently lead to the separation of the spring and the device, more often than not with only the device being extracted from the seat while the spring alone remains separately constrained inside.

Moreover, with this known solution it may occur that, in limit conditions of use where there are elevated stresses on the braking system, the device may come out of the seat separating itself from the spring and assuming a position of incorrect functioning where it might not touch the disk or detect the wear of the pad or even come completely out of the seat of the pad.

From the document EP 0 464 347 of ITT Automotive Europe GmbH it is known of to make a signalling device of the wear of the friction material of a plate having a head connected to a plate seat and constrained therein by means of a spring. Said spring has free ends bent away from said head and coming out of the seat so that an operator can grip it to extract the device from the seat.

This solution too presents the drawbacks listed above and in addition does not allow a precise position of the head to be defined in the seat especially in the direction transversal to the insertion of the head in the seat and also, in the case of stress, in the direction of insertion of the head in the seat.

Other similar solutions are known for example from U.S. Pat. No. 6,360,850 of the Dana Corporation, EP 2 182 236 of Sadeca Systems S.l.u., EP 0 781 936 of Pastic Omnium Cie.

The applicant has felt the need to propose a wear detection sensor and spring assembly which permits a reliable, and sturdy coupling which is lasting over time and which in particular makes it possible to prevent the separation of the sensor from the spring.

The applicant has felt the need to position the sensor in a reliable and repeatable fashion in relation to the pad.

These and further purposes and advantages are achieved by an assembly as described in claim 1 hereto appended, as well as by a kit as described in claim 8 and by a brake caliper as described in claim 9.

According to a general embodiment of the present invention an assembly is provided for detecting the wear of a brake pad of a disk brake, wherein said assembly comprises at least one sensor body and at least one spring, said assembly being suitable for cooperating with said pad which comprises a support plate, suitable for being supported by the disk brake, and to which friction material is associated, suitable for coming into contact with braking surfaces of a disk-brake disk.

Advantageously, said at least one sensor body is coupled geometrically to said support plate, so as to detect the wear of the friction material caused by braking actions, said assembly having a direction of insertion in a corresponding seat of the plate, parallel to a radial direction of the brake disk.

In particular, said at least one spring surrounds said at least one sensor body, so that said at least one spring is positioned in said geometric coupling between said at least one sensor body and said seat in said plate, presenting projections for snap-coupling to said support plate.

Advantageously, said at least one spring has indentations bent towards said insertion direction of the assembly for constraining said at least one spring to said at least one sensor body.

Preferably, said indentations comprise end or terminal sections of the spring with at least one edge thereof facing towards the at least one body.

Advantageously, such spring makes it possible permanently fasten the sensor body to the pad, and in particular to the plate, and to constrain such sensor body integrally to the pad and at the same time to permanently fasten the spring to the sensor body.

Moreover, such provision, in the case the spring has end sections facing each other, permits the spring to completely surround the sensor body and prevent the future separation thereof, as well as to ensure a permanent coupling of the spring and sensor having a precise and certain assembly position in the pad seat.

Moreover, the provision of such a spring entails the absence of parts projecting or extending outside the space occupied by the assembly or, in particular, projecting from the pad, reducing or eliminating the risk of accidental dismantling of the sensor or relative shifting thereof relative to the pad, for example on account of an impact or accidental interaction between such projecting parts and other mechanical parts of the vehicle.

Such absence of extensions projecting from the pad also entails the further advantage of preventing the accumulation of dust in an area of geometric coupling between the sensor and pad, preventing the accumulated dust from causing malfunctioning in the detection of wear of the friction material of the pad or problems or wasting of time during maintenance, for example during the dismantling steps for the replacement of the worn pads.

Alternatively a spring may be envisaged having its end sections bent back on itself inside the spring, so that they work by sticking on a step provided in the sensor body. This way the further advantage of protecting the mounting of the assembly in the plate seat from any external mechanical interaction is achieved, substantially making the coupling of the sensor and the pad irreversible and thereby very resistant to accidental extraction, for example caused by the collision of random obstacles, gathered by the vehicle during driving, with the connection cable of the sensor to the vehicle.

According to such provision, when the assembly is mounted in the respective plate seat, and the spring has therefore performed the snap coupling, an external mechanical action is advantageously almost impossible, thereby guaranteeing a correct positioning of the sensor in relation to the pad, and thereby its correct functioning, for the entire working life of the pad itself, preventing accidental alterations. Such an embodiment entails an irreversible and non-separable assembly.

Further purposes, solutions and advantages are present in the embodiment described below and claimed in the appended claims.

Different embodiments of the invention are described below by means of embodiment examples, made by way of non-limiting examples with reference in particular to the appended drawings wherein.

Figure 6:
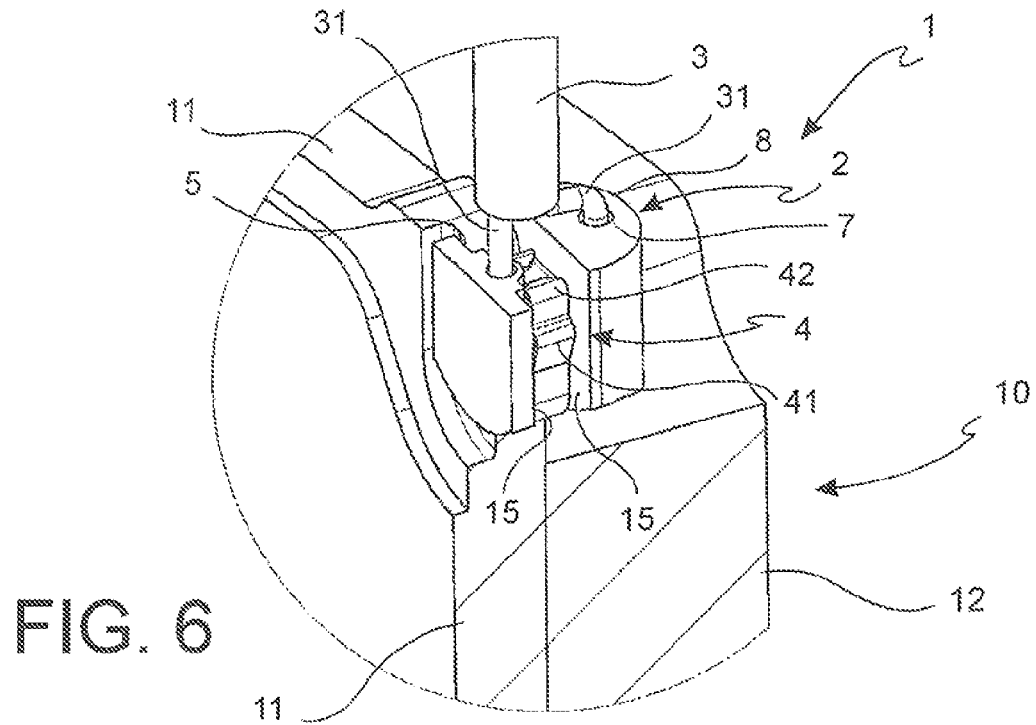
Figure 7:
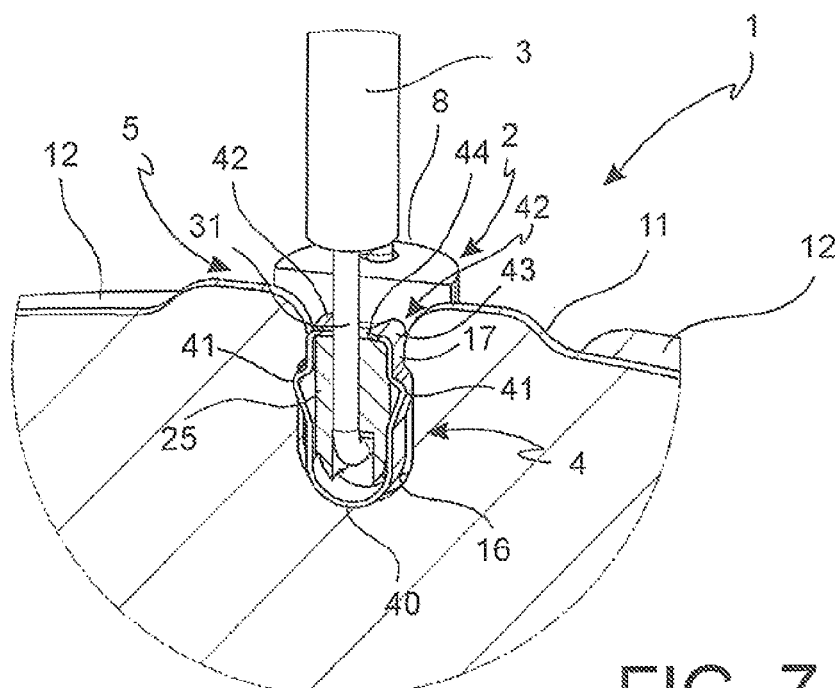
Figure 14:
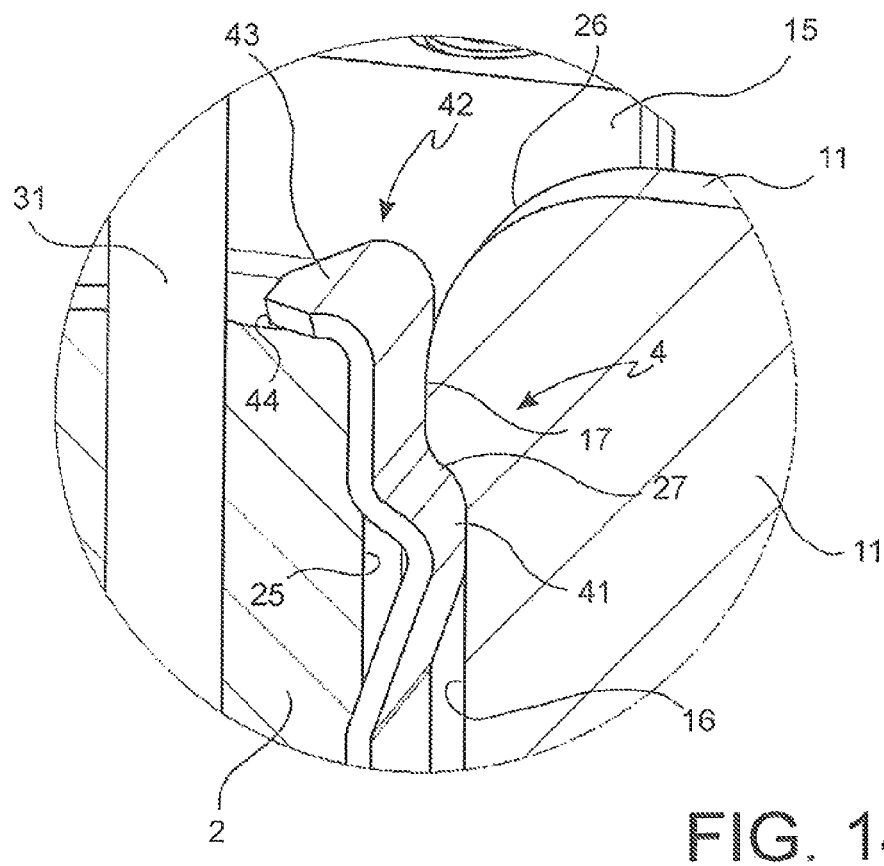
Figure 15:
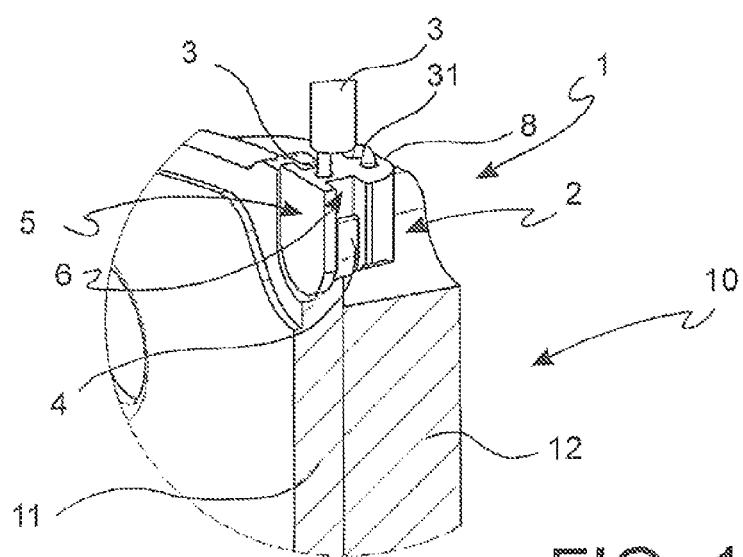
Figure 16:
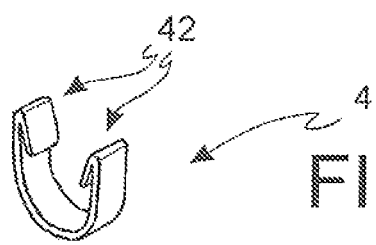
Figure 17:
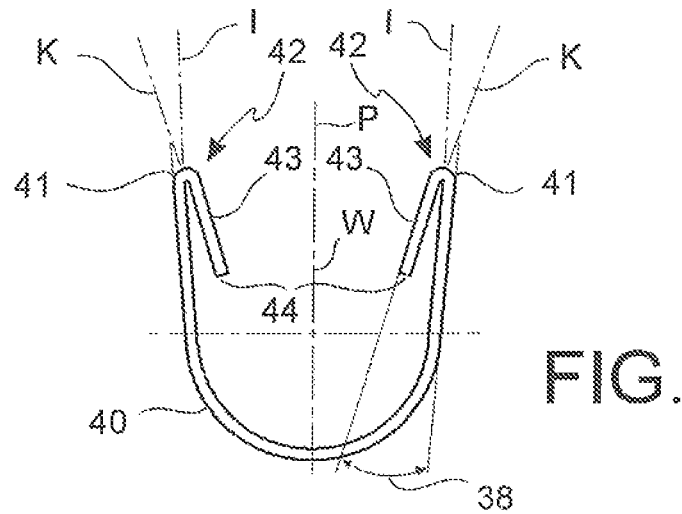
Figure 18:
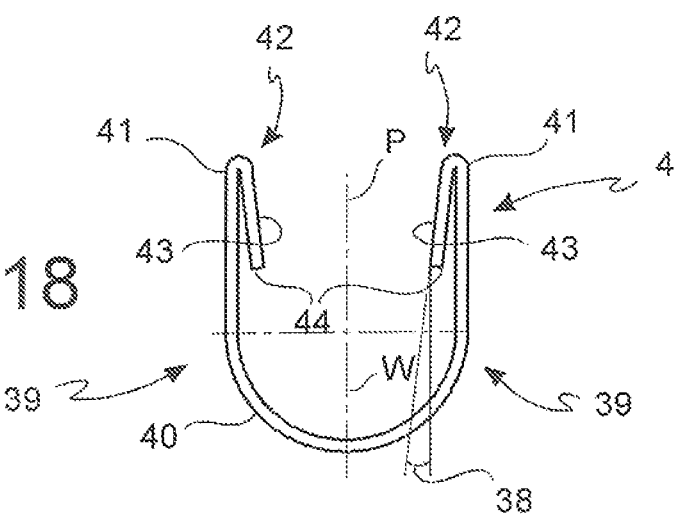
Figure 19:
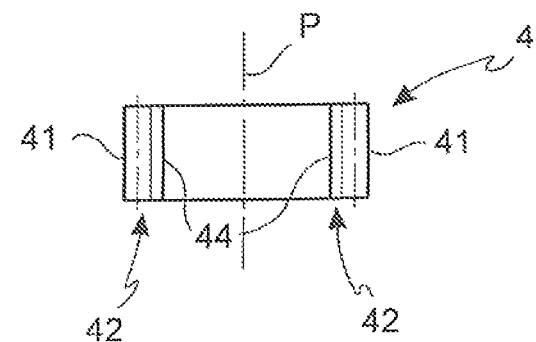
Figure 20:
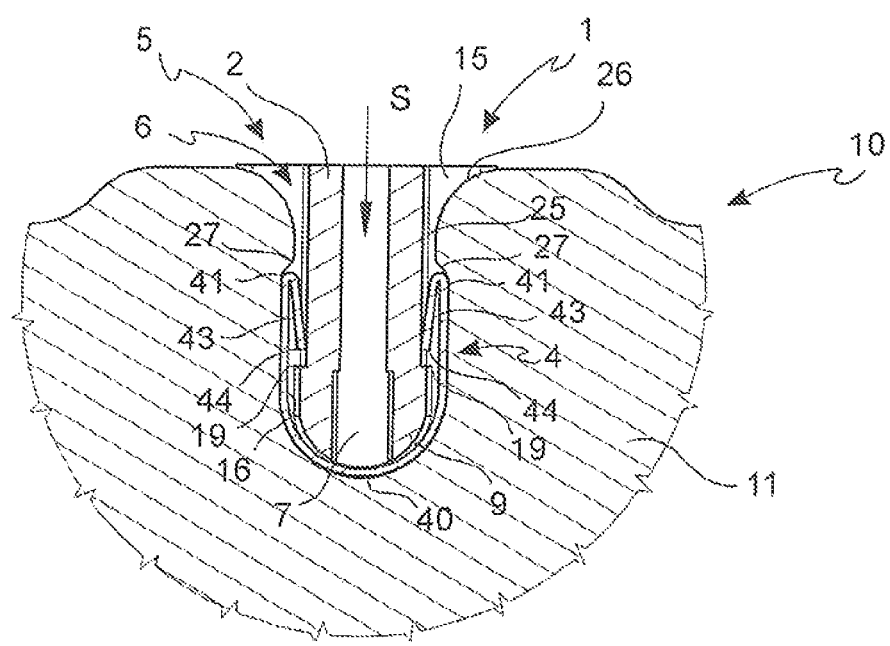
Figure 21:
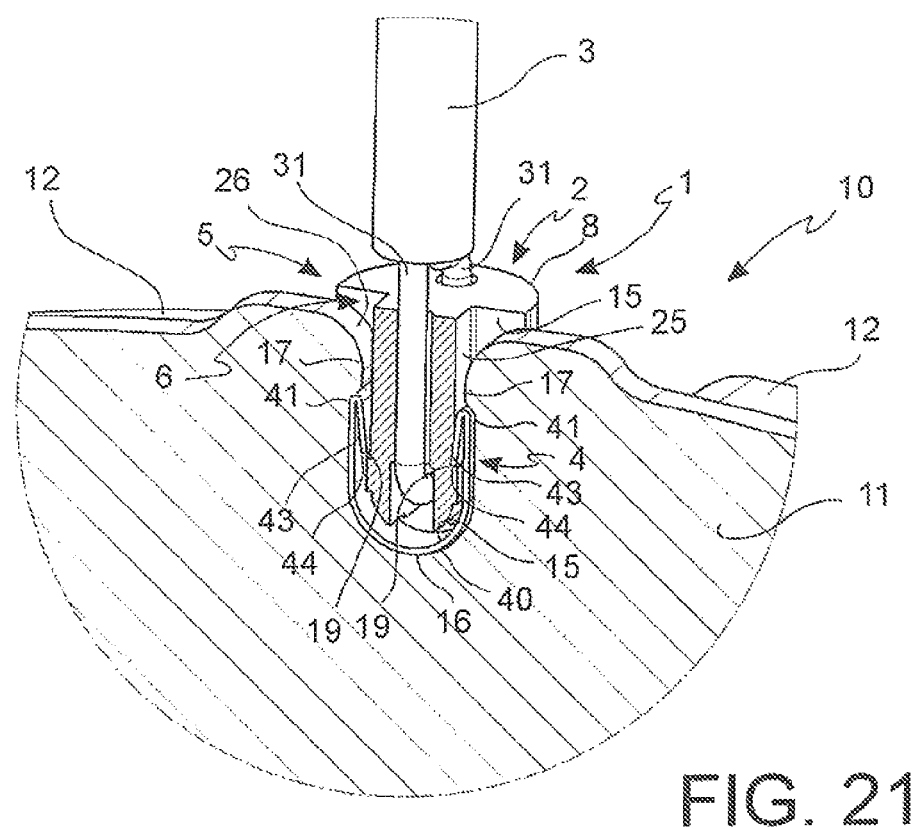
Figure 22:
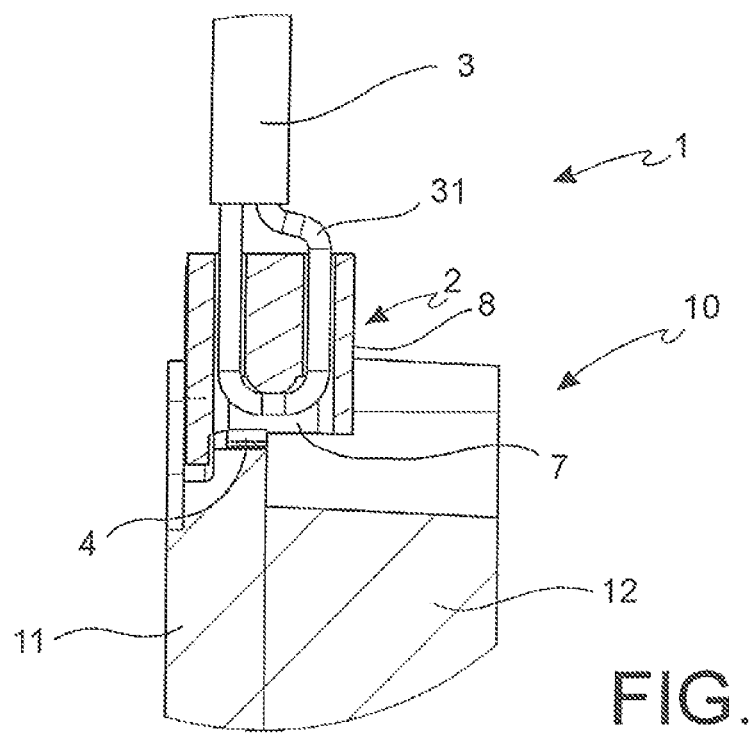
Figure 23:
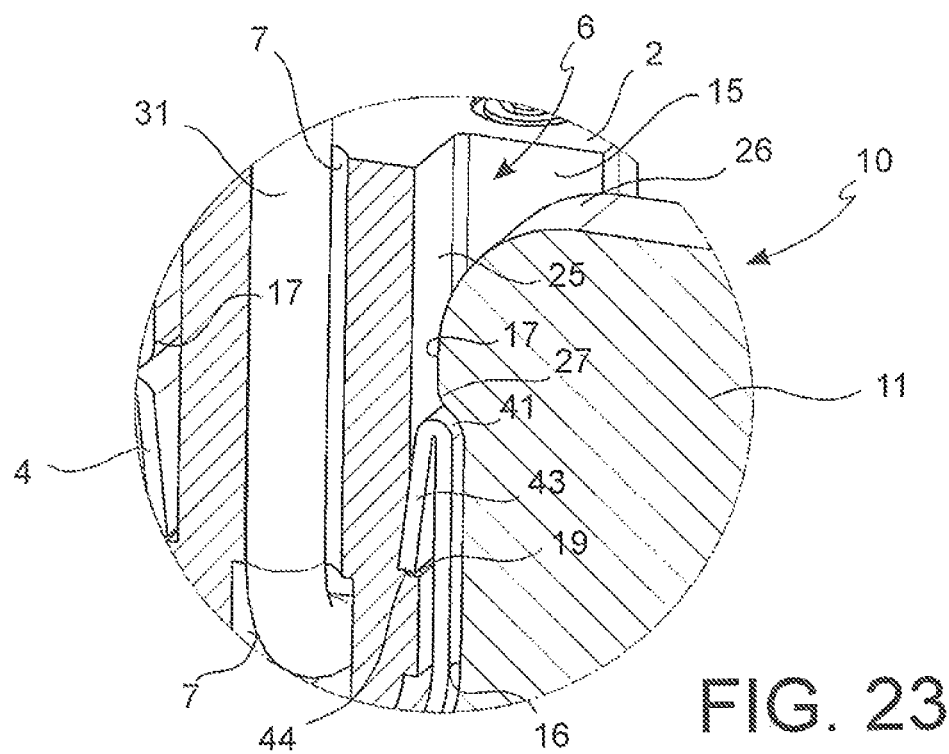
Figure 24:
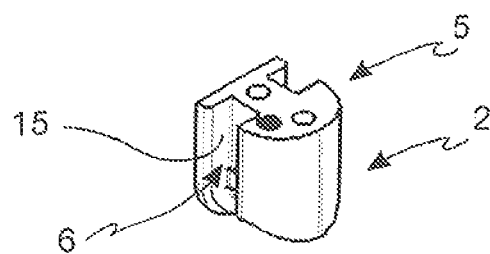
Figure 25:
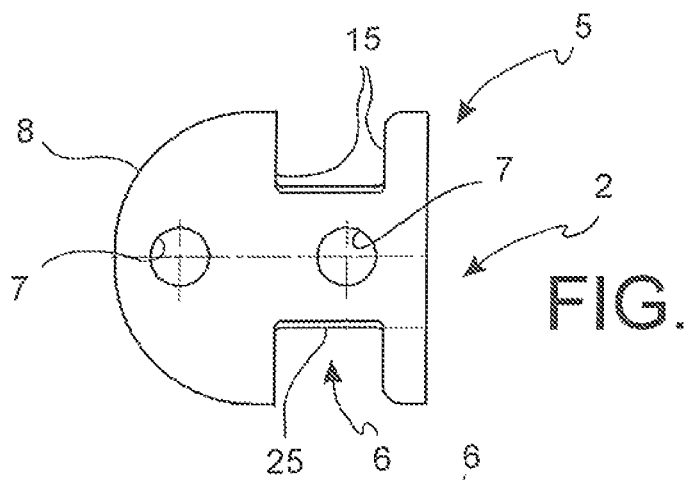
Figure 26:
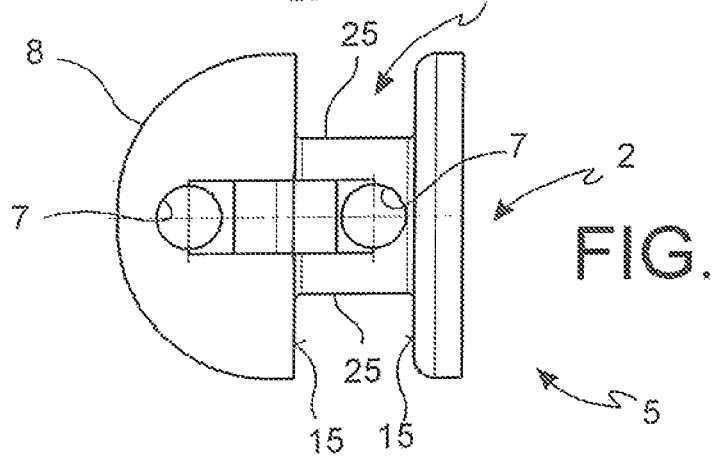
Figure 27:
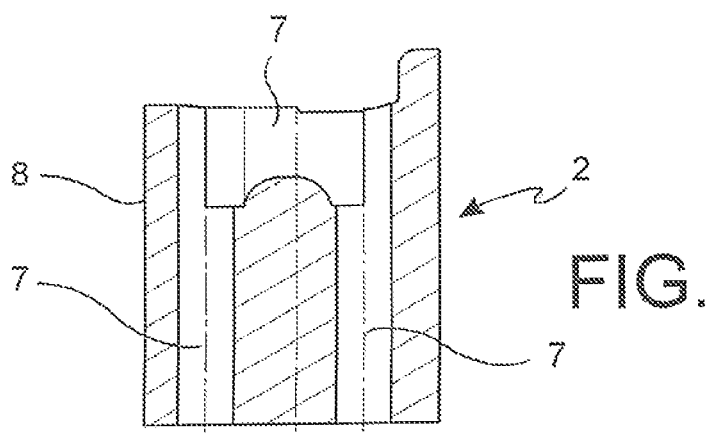
Figure 28:
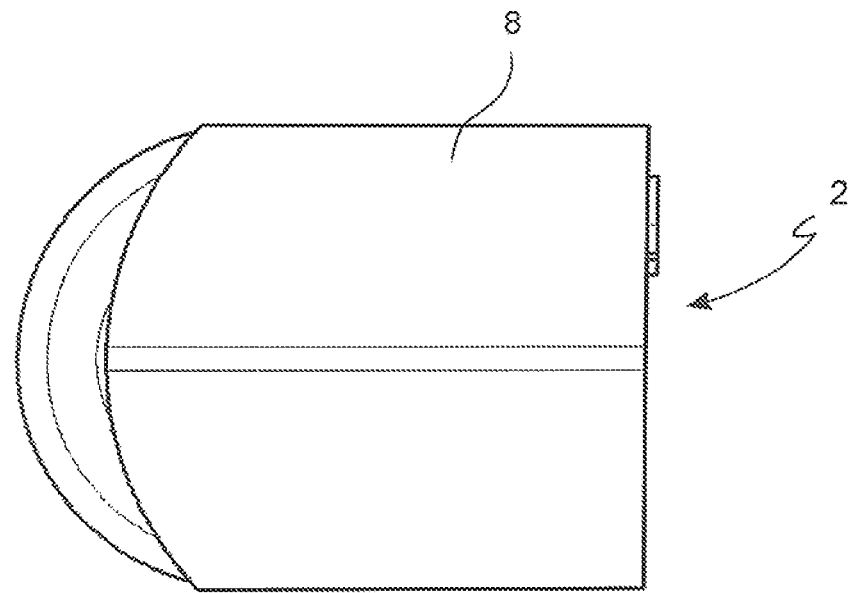
Figure 29:
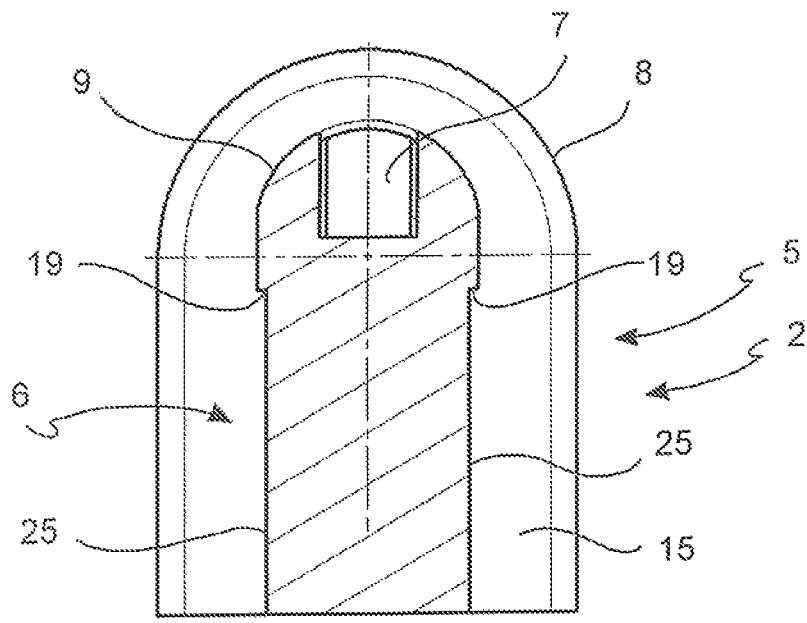

FIGS. 6 and 7 respectively show a cross-section of the pad along a plane perpendicular to the friction surface of the pad and passing through the centre of the assembly seat, and a cross-section of the pad plate along a plane perpendicular to the rotation axis of the disk;

FIG. 8 is a cross-section along the plane in FIG. 6, wherein the assembly is also cross-sectioned;

FIGS. 9 and 10 are respectively a perspective view and a lateral view of a first type of spring of an assembly;

FIG. 11 is a view from above of such a spring,

FIG. 12 shows a cross-section along a plane parallel to the friction surface of the pad and passing through the plate, of the assembly fitted in the plate;

FIG. 13 shows the shape of the seat, in the plate, able to house the aforementioned assembly;

FIG. 14 shows in cross-section a detail of the mounting of the assembly in the plate of the pad;

FIG. 15 shows, in a cross-section view of the pad, a second type of assembly, comprising a spring having end sections bent in the insertion direction of the assembly in the seat, able to work by binding;

FIG. 16 shows a perspective view of such spring in FIG. 15;

FIGS. 17 and 18 show a lateral view of such spring in FIG. 15, respectively in an expanded configuration and in a contracted configuration, the latter configuration being assumed when the assembly is mounted in its seat;

FIG. 19 shows a view from above of such spring in FIG. 15;

FIG. 20 shows a cross-section along a plane passing through the plate and parallel to the friction surface of the pad, mounting of the assembly in the corresponding plate seat;

FIG. 21 shows such assembly in FIG. 20, by means of a cross-section in a perspective view;

FIG. 22 shows in cross-section along a plane perpendicular to the friction surface of the pad and passing through the centre of the plate seat, wherein both the pad and the assembly are shown in cross-section;

FIG. 23 shows in perspective view a detail along a plane parallel to the friction surface of the pad;

FIG. 24 onwards show perspective views of a sensor body;

FIGS. 25 and 26 respectively show such a sensor body as in FIG. 24 from above and below;

FIG. 27 shows such a sensor body as in FIG. 24 in cross-section along a plane orthogonal to the friction surface of the pad;

FIG. 28 shows the sensor body in a front view from the side facing the friction surface of the pad;

FIG. 29 is a cross-section of the sensor body along a plane parallel to the plate and passing through a groove of a slide portion of the sensor body.

Hereinafter reference will be made to an "axial direction" to indicate a direction coinciding with or parallel to the rotation axis of the disk brake; "hub direction" to indicate the side or direction facing the hub or the inside of a vehicle; "wheel direction" to indicate the side or direction facing the wheel of a vehicle; "radial direction" to indicate a direction coinciding with or parallel to a radial direction of the disk brake and/or body of a brake caliper; "extraction" or "exit" to indicate the direction of the path of a sensor coming out of its seat provided in the pad; "insertion" or assembly" to indicate the direction of the path of a sensor going into its seat provided in the pad; "elastic element" to the element acting under pressure or by forced contact on a surface.

Figure 1:
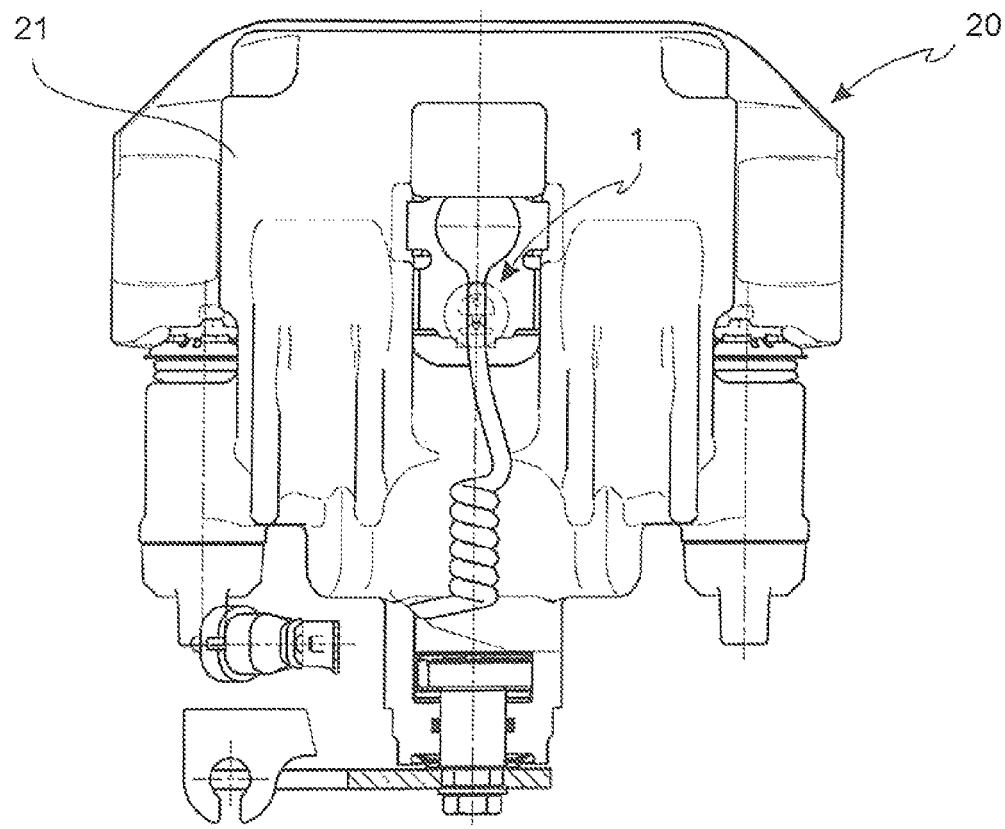
FIG. 1 shows a view from above of a disk brake comprising an assembly according to the invention.
Figure 2:
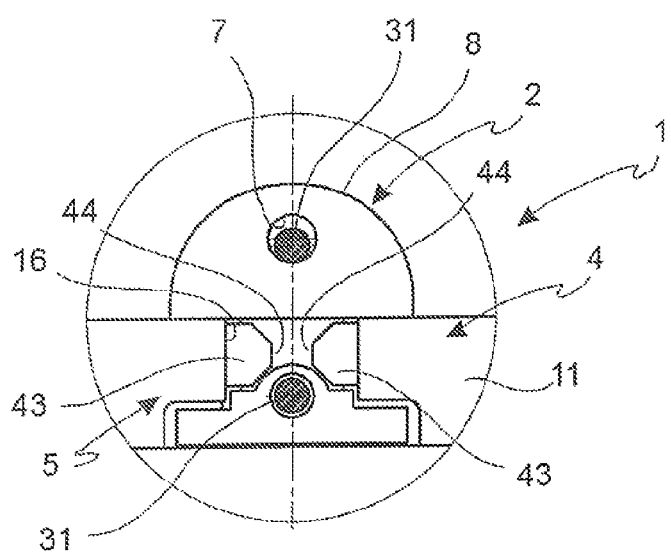
FIG. 2 shows a detail of the aforesaid assembly in FIG. 1.
Figure 3:
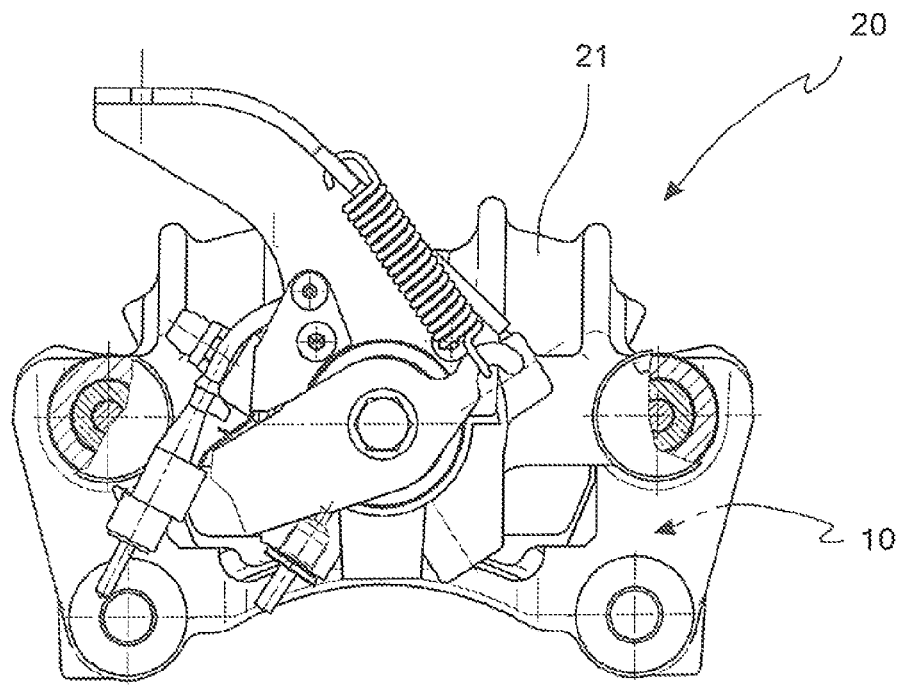
FIG. 3 shows a lateral view of the disk brake in a direction parallel to the rotation axis of the disk.
Figure 4:
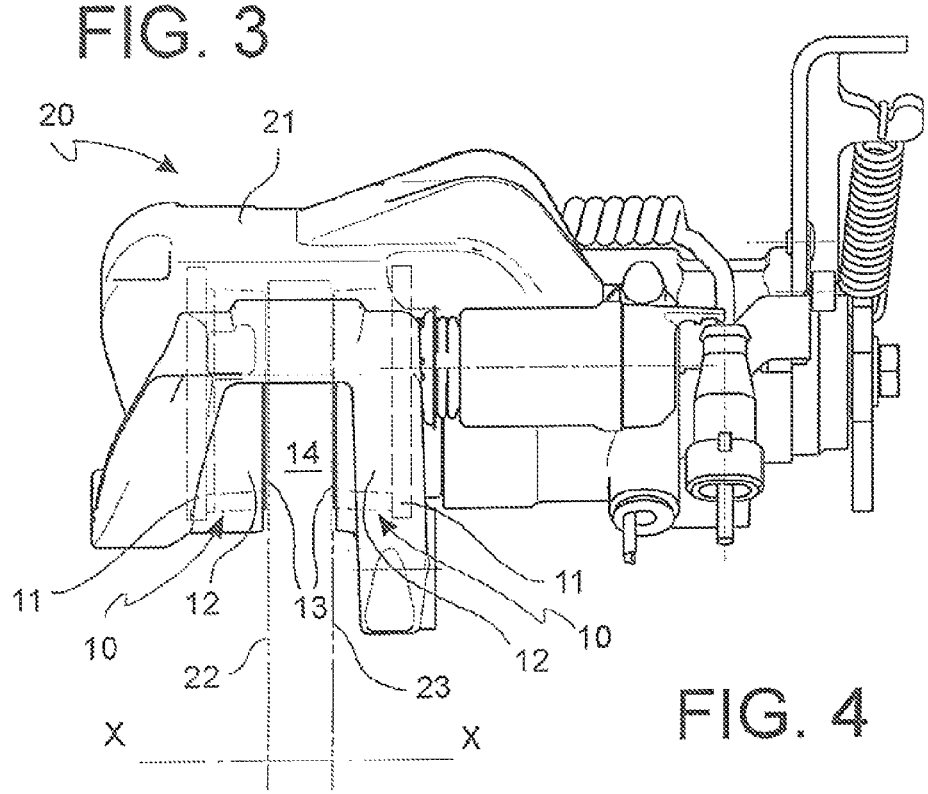
FIG. 4 shows a lateral view of the disk brake in a direction perpendicular to the rotation axis of the disk.

According to one embodiment, a brake caliper comprises a caliper body placed astride a disk brake. Said disk has a rotation axis X-X and opposite friction surfaces which brake pads act on. Said pads are received in said caliper body so as to be able to slide in an direction axial to the brake disk (direction parallel to the axis X-X) to respectively act on said opposite friction surfaces (FIG. 4).

Said caliper body further comprises at least one piston seat suitable for receiving the piston. Said piston comprises a lateral surface suitable for sliding in said piston seat so as to be pushed out of said seat to press at least one of said pads against said friction surfaces of the disk brake.

With reference to the figures, an assembly for detecting the wear of a brake pad of a disk brake is globally denoted by reference numeral 1.

The appended drawings show a disk brake 20 of the floating type, in this case comprising two brake pads 10 which a wear detection assembly of a brake pad 10 can be fitted to at least one of. Such a disk brake 20, for example, comprises a brake body 21 placed astride a disk brake 14, for example a disk as shown in FIG. 4 by the dotted line. Said disk has a rotation axis X-X and opposite friction surfaces 22, 23 which brake pads 10 act on. Said pads are received in said brake body 21 so as to be able to slide in an axial direction to the brake disk (direction parallel to the axis X-X) to respectively act on said opposite friction surfaces 22 and 23.

The aforesaid type of disk brake is merely indicative in that the assembly 1 according to the present invention can be fitted on brake pads used in any type of disk brake, as a result the aforementioned assembly can also be fitted on brake pads of a non-floating calliper type disk brake.

Moreover, the assembly 1 can also be fitted in embodiments of disk brakes with several pads per side, and in embodiments of disk brakes with floating disk.

In general, such assembly is suitable for cooperating with a pad 10, which comprises a support plate, suitable for being supported by the disk brake 20, and to which friction material 12 is associated, suitable for coming into contact with braking surfaces 22 and 23 of a disk-brake disk 20.

More specifically, the invention relates to an assembly 1 for detecting the wear of a pad 10 of a disk brake comprising at least one sensor body 2 and at least one spring 4 able to snap couple the sensor body to the support plate 11 of the pad, for example by means of a geometric coupling so as to detect the wear of the friction material 12 caused by braking actions.

According to one embodiment, the aforesaid at least one sensor body 2 is geometrically coupled to a plate 11 of a pad 10 for disk brakes by means of respective geometric coupling surfaces made on said at least one body 2 and/or on said plate 11.

According to one embodiment, the aforesaid coupling surfaces are formed of a coupling groove 6 in the sensor body 2 couplable, for example positioning itself astride walls which delimit a respective and corresponding seat 16 made in the plate 11. The coupling groove is formed of two lateral surfaces 15 and one bottom surface 25.

Moreover, the at least one body 2 has a predefined insertion direction S-S in the coupling seat 16 of the support plate 11 and sensor body 2, for example in a direction substantially parallel to the radial direction.

The spring 4 is shaped so as to surround the sensor body 2 so that the spring 4 is positioned in the geometric coupling between the sensor body 2 and the plate 11, presenting projections 41 for the snap coupling with the support plate 11.

In particular, the spring 4 is shaped so as to firmly attach the sensor body 2 to the pad 10, in particular to the plate 11, and to constrain such sensor body integrally to the pad 10.

According to one embodiment, the spring 4 remains operatively entirely enclosed within said seat 16 in the plate 11, remaining entirely located in the semi-space facing towards the plate defined by a plane transversal to the insertion direction S-S and tangential to the plate 11 at a mouth of said seat 16 of the plate 11.

Such conformation of the spring 4, not presenting parts projecting in relation to the plate entails the advantage of protecting said spring from any accidental interaction with external objects which would result in a consequent detachment of the sensor 2 from the plate 11, thereby preventing the sensor from detecting the wear of the friction material 12 making it impossible to ensure and guarantee over time the right dimensional characteristics of the pad for permitting safe and efficient braking. In fact, above all, but not only, in the case of working vehicles transiting in areas where detritus or other objects are present, it is possible that the detritus itself, or for example rubble, twigs, rags, wires and similar objects reach the sensor area causing it to be pushed out of its seat. The absence of projecting parts of the spring prevents such objects from remaining tangled or having a mechanical release effect of the snap coupling of the spring in its seat, a release which would lead to a relative shift of the sensor in relation to the plate or, in extreme cases, to the extremely dangerous ripping of the sensor from its seat in the plate.

According to the present invention, the aforementioned spring 4 has indentations 42 bent towards the at least one sensor body 2 to constrain the at least one spring 4 to said at least one sensor body 2.

The aforesaid indentations 42 comprise end or terminal sections 43 of the spring with at least one edge 44 thereof facing towards the at least one body 2, wherein, according to one embodiment, such edge delimits the end of the aforesaid end sections 43.

According to one embodiment, such a spring 4 is substantially U-shaped, having two lateral portions 39, a connection portion 40 which joins such lateral portions 39, such connection portion being in particular curved, two free ends which form two reciprocally facing indentations 42 having respective end sections 43 bent towards the inside of the spring 4 according to a predefined bending angle 38 in relation to a direction substantially parallel to said insertion direction S-S (FIG. 10).

The aforesaid bending angle 38 of the end sections 43, measured in relation to the lateral portions 39 of the spring 4 may be chosen, according to one embodiment, less than 90° (FIG. 10).

In one embodiment, the angle 38 may be less than 90°, or much less than 90°, so that each end section 43 is operatively close to the respective lateral portion 39 of the spring 4 to work by binding on the sensor body 2.

Each terminal section 43 forms an elbow 37 with the respective lateral portion 39 of the spring 4.

According to one embodiment, said at least one projection 41 coincides with a respective elbow 37. According to one embodiment, said elbow 37 is suitable for snap coupling to the support plate 11, in particular with the walls of the plate delimiting the sensor seat (FIGS. 16-23).

According to one embodiment, the spring 4 is a shape symmetrical to an intermediate plane passing through the insertion direction S-S.

Such spring 4 is advantageously shaped like a folded ribbon, in particular is a folded metal sheet.

According to one embodiment, the aforesaid spring is made in metallic material, for example pre-stressed steel for springs, stainless steel. Alternatively it may be made in composite material or synthetic such as plastic, or, in another material which comprises characteristics of elasticity such as to permit the fitting of the sensor 2 in the plate 11 and its retention in position and which is suitable for withstanding the conditions of use in a disk brake, such as for example the braking temperatures.

In one embodiment of the present invention the detection assembly 1 of the wear of a brake pad 10 of a disk brake 20, comprises at least one sensor body 2, at least one electrical cable 3 and at least one spring 4.

In one embodiment, the sensor body 2 comprises at least one slide portion 5 comprising at least one groove 6 for geometric coupling, said groove 6 having lateral walls 15 and a bottom surface 25, suitable for coupling to a coupling seat 16 provided in said support plate 11, for example but not necessarily positioning itself astride the walls of the plate which delimit said seat.

This way, the sensor remains with a wearable portion 8 of said at least one body 2 partially in the area of the friction material 12 of the pad 10 so as to be wearable during braking actions.

According to one embodiment, the wearable portion 8 of said at least one sensor body 2 comprises at least one seat 7 suitable for receiving at least one section 31 of an electrical cable 3 so that it is worn, for example shorn, and/or modifies the signal sent from it to a detection device, during braking actions interrupting the electrical continuity or varying the signal of a detection circuit and indicating a wear limit of the friction material 12, beyond which it is advisable to replace the pad to prevent a substantial reduction of the braking capacity and damage to the disk caused by the contact with friction of the parts of the pad in different material from the friction material 12 of the pad.

Advantageously, the at least one spring 4 which surrounds the at least one sensor body 2 and is arranged in the coupling groove 6 with the plate 11, has projections 41 directed according to a first predefined direction I-I away from the at least one sensor body 2 for the snap-coupling in the seat 16 of the support plate 11 provided with corresponding narrowed portions 17.

In other words, such narrowed portions 17, compared to the walls of the seat 16 provided in the plate, form a narrowed mouth which widens inside the seat after the narrowed portions 17 in the insertion direction S-S. Such narrowed portions 17, in relation to the mouth of the seat 16, form an undercut in abutment against which the projections 41 remain operatively engaged in abutment.

Advantageously, the at least one spring 4 has advantageously indentations 42 bent towards the at least one sensor body 2 to constrain the at least one spring 4 to said at least one sensor body 2. Such indentations 2 comprise free end or terminal sections 43 of the spring with at least one end edge 44 thereof facing towards the at least one body 2.

The aforesaid at least one edge 44, which delimits the end section 43 of the spring, is defined by an end section wall 43 of the spring which in a particular embodiment, is positioned according to a second predefined direction K-K.

In other words, the edge 44 which delimits the end section 43 of the spring is arranged on a through plane of a second predefined direction (K-K).

According to one embodiment, the end section 43 has an approach direction to the at least one sensor body 2 along the second predefined direction K-K opposite the direction moving away from the at least one sensor body 2 of the section of spring defining the projections 41 along the first predefined direction I-I, wherein said directions are defined in relation to the aforesaid predefined insertion direction S-S of the least one sensor body 2.

In one embodiment, the aforesaid second predefined direction K-K of the end section 43 and the aforesaid first predefined direction I-I of the section of spring defining the projections 41 coincide.

In another embodiment, the aforesaid second predefined direction K-K of the end section 43 and the first predefined direction I-I of the sections of spring defining the projections 41 are sections which work by binding against the sensor body 2 to prevent the exit of the assembly 1 from the seat 16 of the support plate 11.

According to one embodiment, the sensor body 2 comprises at least one retention surface 18 or 19 which extends at least partly transversally to said insertion direction S-S, said surface 18 or 19 being suitable for cooperating with said end section 43 and/or said at least one edge 44 of the end section 43, said surface abutting against said edge preventing the sensor body 2 from being released from the spring 4.

Said retention surface may be an end surface 18 of the sensor body or, according to one embodiment, is at least one lateral shoulder 19 of the sensor body 2 arranged laterally in relation to said insertion direction S-S.

In the first case, according to a first embodiment of the invention, the end edges 44 engage the sensor 2 on an end abutment surface 18 of the sensor body 2. This way, the indentation 42 of the spring, and in particular the end sections 43 cling and firmly grasp the sensor body 2 preventing it from being released from the spring 4, and the edges 44 of the end sections 43, for example, hook such end abutment surface 18.

In other words, such shape of the spring 4 permits it to surround the sensor body and prevent the future separation thereof, as well as to ensure a permanent coupling having a precise and certain assembly position.

Moreover, the absence of parts projecting or extending outside the space occupied by the assembly or projecting from the pad, reduces or eliminates the risk of accidental dismantling of the sensor or shifting thereof relative to the pad, on account of an impact or accidental interaction between such projecting parts and other mechanical parts of the vehicle. The absence of extensions projecting from the pad also prevents the accumulation of dust in a geometric coupling zone between the sensor and the pad.

In a second embodiment of the invention, the ends 43, for example the end edges 44 of the spring are able to engage by binding against corresponding lateral shoulders 19 of the sensor body 2.

According to one embodiment, said lateral shoulders may be obtained on the aforesaid bottom surface 25 of the coupling groove 6 of the sensor body 2.

According to one embodiment, in such second embodiment of the spring 4, the end sections are folded onto themselves inside the spring 4 and towards the curved connection portion 40, working by binding in the groove 6 of the sensor body 2. This second type of embodiment of the spring 4 protects the fitting of the assembly in the plate seat from any external mechanical interaction. When the assembly 1 is mounted in the respective plate seat, and the spring 4 has therefore performed the snap coupling, an external mechanical action to disengage the assembly from the pad without irremediably altering the assembly, is almost impossible. This way, a correct positioning of the sensor in relation to the pad, and thereby its correct functioning, for the entire working life of the pad itself, is guaranteed. In addition undesirable re-use of sensors already partially worn and the correct functioning of which is probably jeopardised is also avoided. Such an embodiment entails an irreversible and non-separable assembly.

In both the aforesaid embodiments according to one embodiment, a minimum clearance between the end sections 43 of the spring and respectively the retention surfaces 18 or the binding edges 19 is operatively envisaged to permit the elastic return of the spring after completing the snap fitting of the assembly 1 into the coupling seat 16 of the plate 11.

An assembly method of an assembly for detecting the wear 1 of a brake pad 10 of a disk brake 20 will be described below, according to the present invention comprising a sensor body 2 and a spring 4 able to constrain the sensor body 2 integrally with the brake pad 10.

The spring 4 is initially coupled to the sensor body 2 so as to surround the sensor body 2, in particular along the coupling groove 6 of the sensor body 2, and inside and on the bottom of such groove 6, so that the indentations 42 of the spring, in particular the end sections 43, engage the sensor 2 and prevent it from detaching from the spring.

The spring 4 may be coupled to the groove 6 of the sensor body 2, for example making the sensor body 2 penetrate inside the "U" shape of the spring 4, in particular making the edges 44 of the end section 43 of the spring 4 on a curved draft portion of the groove 6, for example in the shape of a semi circle. This way as the slotted portion 9 gradually penetrate inside the "U" shape of the spring 4, the edges 44 sliding on such draft portion 9, make the spring 4 widen elastically. In this operation, when the edges 44 go past the retention surface 18 or the binding edges 19 of the sensor body 2, the spring 4 snap retracts drawing the indentations 42 of the spring 4 together to retain the sensor body 2.

The assembly 1 of the sensor body 2 and spring is thus assembled.

Subsequently, the assembly 1 thus formed is inserted in the plate-sensor coupling seat 16 formed in the plate 11 of the pad 10, in the insertion direction S-S.

During such insertion, the projections 41 slide first on the draft sections 26 of the seat at the entrance, in particular inclined or convex to the direction S-S, and against the walls of the coupling seat 16.

This way, during the insertion the projections 41 are elastically compressed towards each other by a narrowed entrance section of the seat 16 having the narrowed portions 17.

For the purposes of insertion, once past the narrowed portions 17, the projections 41 expand elastically, snap blocking the assembly 1 inside the seat 16, for example engaging the surfaces of the undercuts, achieving a precise, stable and resistant coupling of the sensor body 2 to the brake pad 10.

The functioning of an assembly for detecting the wear of a brake pad of a disk brake comprising a sensor body and a spring able to retain the sensor body integrally to the brake pad will be described below.

Figure 5:
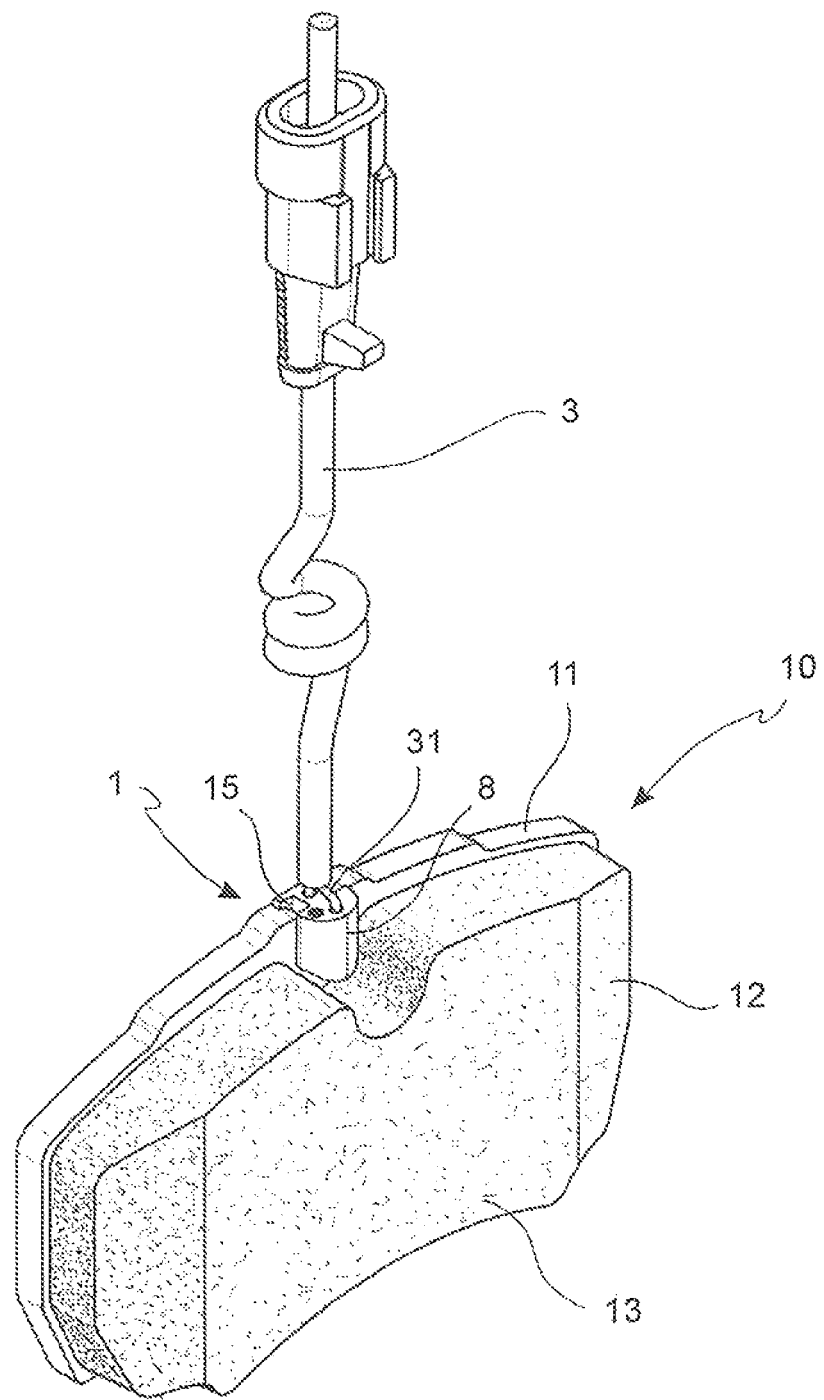
FIG. 5 is a perspective view of a wear detection assembly of a brake pad of a disk brake, fitted on a support plate.

The sensor body is shaped so as to present, when permanently fitted to the brake pad, a wearable portion 8 projecting in relation to the support plate 11, on the side of the friction material 12 of the pad (FIG. 5), but initially rearward of the braking surface 13 of the pad.

Gradually as the brake is used, the friction material 12, rubbing with friction against the friction surface 23 of the disk during braking, is gradually worn and its transversal thickness is gradually reduced. Thus as the wear of the friction material 12 gradually advances, the braking surface 13 gradually approaches the plate 11.

When the braking surface 13 reaches the level of the wearable portion 8 of the sensor body 2, as well as the friction material 12 further wearing itself, at the same time the wearable portion 8 of the sensor body is also gradually worn. From this moment the wear of the friction material 12 of the pad and the wear of the wearable portion of the sensor body proceed at the same rate.

When the braking surface 13, as a result of increased wear, reaches the section of electric cable 31 engaged in the sensor body, the cross-section of such electric cable is reduced, as a consequence increasing the electric resistance of the cable 31.

An electric circuit of the known type electrically connected to such electric cable 31, detects the variation of such electrical resistance providing in output a signal proportional to the aforesaid cross-section and therefore to the aforesaid current thickness of the friction material 12, and consequently of the level of wear of the brake pads 10.

When the braking surface 13, advancing further towards the plate 11, passes beyond the thickness of the cable 31, it interrupts such cable and opens the aforesaid electric circuit which supplies a signal of pad worn out and therefore needing replacement.

A person skilled in the art may make numerous modifications, adaptations and variations of elements with others functionally equivalent to the preferred embodiment solution of the device described above so as to satisfy contingent and specific requirements while remaining within the sphere of protection of the invention as defined by the following claims.

For example, according to an alternative embodiment of the device, the spring 4 may be a symmetrical shape in relation to a predefined plane of symmetry P.

According to one embodiment, said predefined plane of symmetry P passes through a predefined axis of symmetry W-W, which, for example but not necessarily coincides with the insertion direction S-S of the spring 4 in the seat 16 of the plate 11.

According to one embodiment, the spring 4 extends specularly in relation to a plane of symmetry P which passes along the insertion direction S-S, which for example, but not necessarily coincides with the centreline plane.

According to one embodiment, the end sections 43 of the spring are facing towards said predefined plane of symmetry P.

Thanks to these provisions, said spring 4 acts on the sensor body 2 in a balanced manner in relation to the plane of symmetry P, autocentring the sensor 2 inside the seat of the plate and compensating any difference in shape between the groove 6 of the sensor body 2 and the seat 16 in the plate, also permitting ample fitting tolerances.

The assembly 1 for detecting the wear of a brake pad 10, according to the present invention, has the following important advantages.

The embodiments described of the spring 4 of the assembly according to the present invention are suitable for integrally surrounding the sensor body 2 and for firmly anchoring the sensor 2 in the seat 16 of the plate 11. No relative random involuntary or voluntary movement between the sensor body and brake pad is permitted after assembly. This permits a correct positioning of the sensor in relation to the pad, for the entire working life of the pad.

Moreover, the absence of parts of the spring 4 projecting from the space occupied by the assembly prevents accidental interactions with other mechanical parts of the vehicle.

Furthermore, the absence of parts projecting from the space occupied by the assembly prevents the accumulation of dust or detritus or products of the friction forces in the operative sliding between the disk and the braking surface of the pad during braking, helping to ensure reliability, braking efficiency and safety.

The invention claimed is:

1. Assembly for detecting the wear of a brake pad of a disk brake, wherein said assembly comprises at least one sensor body and at least one spring, said assembly being suitable for cooperating with said pad which comprises a support plate, suitable for being supported by the disk brake, and to which friction material is associated, suitable for coming into contact with braking surfaces of a disk-brake disk and wherein;
said at least one sensor body is coupled to said support plate, so as to detect the wear of the friction material caused by braking actions, said assembly having an insertion direction (S-S) into a corresponding seat of the plate, parallel to a radial direction of the brake disk;
said at least one spring surrounding said at least one sensor body, so that said at least one spring is arranged in said geometric coupling between said at least one sensor body and said seat in said plate and having projections for the snap-coupling with said support plate, characterised in that;
said at least one spring has indentations folded towards said insertion direction (S-S) of the assembly for constraining said at least one spring to said at least one sensor body wherein;
said indentations comprise end or terminal sections of the spring with at least one edge thereof facing towards the at least one body.

2. Assembly, according to claim 1, comprising at least one sensor body, at least one electrical cable and at least one spring, and wherein;

said sensor body comprises a wearable portion operatively projecting with respect to the support plate, on the side of the friction material of the pad remaining at least partly in the area of the friction material so as to be wearable during braking actions;

said wearable portion of said at least one sensor body comprising at least one seat suitable for receiving at least one section of said electrical cable so that said cable is subjected to wear and shearing during braking actions interrupting the electrical continuity of a detection circuit and indicating a wear limit of the friction material;

said at least one sensor body comprising at least one slide portion having at least one groove for geometric coupling, said groove having lateral walls and a bottom surface, suitable for coupling to a coupling seat provided in said support plate, remaining with a wearable portion of said at least one body partly in the area of the friction material of the pad so as to be wearable during braking actions;

said at least one spring surrounding said at least one sensor body, said at least one spring being arranged in said coupling groove with the plate and having projections directed according to a first predefined direction (I-I) away from the at least one sensor body for the snap-coupling in the seat of the support plate provided with corresponding indentations, and/or wherein;

said at least one spring has indentations bent towards the at least one sensor body for constraining said at least one spring to said at least one sensor body, said indentations comprising free end or terminal sections of the spring which are directed-with at least one end edge thereof towards the at least one body, and/or wherein;

said at least one edge which delimits said end section of the spring is positioned on a through plane of a second predefined direction (K-K), and/or wherein;

said at least one body has a predefined insertion direction (S-S) into said coupling seat of the support plate and sensor body, and/or wherein;

said end section has a direction of approach to the at least one body of the sensor along said second predefined direction (K-K) opposite with respect to the direction moving away from the at least one sensor body of said section of spring defining said projections along said first predefined direction (I-I), said directions being defined in relation to a transversal direction to said predefined insertion direction (S-S) of said at least one sensor body, and/or wherein;

said end section facing so as to approach according to said second predefined direction (K-K) and said spring sections defining said projections outwards according to said first predefined direction (I-I) working in binding to prevent the exit of the assembly of the at least one sensor body and of the spring from the seat of the support plate and/or wherein;

said second predefined direction (K-K) of said end section and said first predefined direction (I-I) of said spring section defining said projections coincide with respect to each other.

3. Assembly, according to claim 1, wherein said spring is symmetrical-shaped with respect to a predefined symmetry plane (P) and/or wherein said predefined symmetry plane (P) passes through a predefined symmetry axis (W-W) coinciding with said insertion direction (S-S) of said spring into said seat (16) of said plate.

4. Assembly, according to claim 1, wherein said spring is substantially U-shaped, having two lateral portions which extend on opposite sides with respect to said insertion direction (S-S), a connection portion which joins such lateral portions, two free ends which form two indentations having respective end sections bent towards the inside of the spring (4) according to a predefined bending angle which is an acute angle with respect to a direction substantially parallel to said insertion direction (S-S).

5. Assembly, according to claim 1, wherein said sensor body (2) comprises at least one retention surface which extends at least partly transversally to said insertion direction (S-S), said surface being suitable for cooperating with said at least one edge of the end section, said retention surface operating in abutment with said edge preventing the sensor body from being released from said spring, and/or wherein said retention surface is an end surface of the sensor body, and/or wherein said retention surface is at least one shoulder of the sensor body positioned laterally with respect to said of insertion direction (S-S).

6. Assembly, according to claim 1, wherein said at least one end section forms an elbow with the respective lateral portion of the spring, said at least one projection coinciding with said respective elbow, said elbow being suitable for snap-coupling to the support plate.

7. Brake pad kit for disk brake, comprising:
an assembly according to claim 1, for detecting the wear of a brake pad; a brake pad suitable for housing said at least one detection assembly.

8. Kit according to claim 7, wherein said spring remains operatively entirely enclosed within said seat in the plate, remaining entirely located in the semi-space facing towards the plate defined, by a plane transversal to the insertion direction (S-S) and tangential to the plate at a mouth of said seat of the plate.

9. Brake caliper for disk brake, comprising:
at least one assembly for detecting the wear of a brake pad, said assembly having the characteristics of claim 1; at least one brake pad suitable for housing said detection assembly;
a caliper body positioned astride a brake disk having opposite friction surfaces, said at least one pad being received in said caliper body so as to be able to slide in the direction axial to the brake disk for respectively operating on said opposite friction surfaces.

10. Brake caliper for disk brake according to claim 8, wherein said spring remains operatively entirely enclosed within said seat in the plate, remaining entirely located in the semi-space facing towards the plate defined by a plane transversal to the insertion direction (S-S) and tangential to the plate at a mouth of said seat of the plate.

* * * * *